(12) United States Patent
Kraynov et al.

(10) Patent No.: US 10,339,191 B2
(45) Date of Patent: Jul. 2, 2019

(54) METHOD OF AND A SYSTEM FOR PROCESSING A SEARCH QUERY

(71) Applicant: YANDEX EUROPE AG, Lucerne (CH)

(72) Inventors: Aleksandr Georgievich Kraynov, Moscow (RU); Marat Raisovich Khabibrakhmanov, Moscow (RU); Boris Dmitrievich Moiseev, Moscow (RU)

(73) Assignee: Yandex Europe AG, Lucerne (CH)

( * ) Notice: Subject to any disclaimer, the term of this patent is extended or adjusted under 35 U.S.C. 154(b) by 268 days.

(21) Appl. No.: 15/327,473

(22) PCT Filed: Jan. 29, 2015

(86) PCT No.: PCT/IB2015/050690
§ 371 (c)(1),
(2) Date: Jan. 19, 2017

(87) PCT Pub. No.: WO2016/016733
PCT Pub. Date: Feb. 4, 2016

(65) Prior Publication Data
US 2017/0199939 A1   Jul. 13, 2017

(30) Foreign Application Priority Data
Jul. 29, 2014   (RU) ................................ 2014131311

(51) Int. Cl.
*G06F 16/00* (2019.01)
*G06F 16/9535* (2019.01)
(Continued)

(52) U.S. Cl.
CPC .... *G06F 16/9535* (2019.01); *G06F 16/24578* (2019.01); *G06F 16/955* (2019.01); *G06N 3/08* (2013.01); *G06N 5/04* (2013.01)

(58) Field of Classification Search
CPC combination set(s) only.
See application file for complete search history.

(56) References Cited

U.S. PATENT DOCUMENTS

| 7,680,854 B2 * | 3/2010 | Hyder ................... G06Q 10/10 707/710 |
| 2002/0032677 A1 * | 3/2002 | Morgenthaler ......... G06F 16/70 |

(Continued)

FOREIGN PATENT DOCUMENTS

| CN | 100583738 C | 1/2010 |
| RU | 2424566 C2 | 2/2010 |
| RU | 2442213 C2 | 2/2012 |

OTHER PUBLICATIONS

International Search Report from PCT/IB2015/050690, dated Jun. 5, 2015, Lee W. Young.
(Continued)

*Primary Examiner* — Farhan M Syed
(74) *Attorney, Agent, or Firm* — BCF LLP

(57) ABSTRACT

There is disclosed a method of and system for performing a search responsive to a search query from a user via an electronic device and generating a search engine result page (SERP) responsive to the search query, in which the search results included in the SERP are ranked in part based upon an appeal factor. The method comprising: receiving the search query from the electronic device of the user, performing a search and creating a list of search results, ranking the list of search results, the ranking process including: accessing a screenshot of at least one web page in the list of search results, determining an appeal factor of the at least one web page based on the screenshot, the appeal factor representing a probability that the web page is appealing to the user, and ranking the at least one web page in the list of search results.

4 Claims, 5 Drawing Sheets

(51) Int. Cl.
    *G06F 16/955* (2019.01)
    *G06F 16/2457* (2019.01)
    *G06N 3/08* (2006.01)
    *G06N 5/04* (2006.01)

(56) References Cited

U.S. PATENT DOCUMENTS

| | | | | |
|---|---|---|---|---|
| 2010/0306708 | A1* | 12/2010 | Trenz | G06F 3/0482 715/853 |
| 2011/0106630 | A1* | 5/2011 | Hegeman | G06Q 30/02 705/14.71 |
| 2011/0153602 | A1* | 6/2011 | Kiddle | G06F 16/435 707/731 |
| 2011/0246446 | A1* | 10/2011 | Jarboe | G06F 16/951 707/713 |
| 2012/0047135 | A1* | 2/2012 | Hansson | G06Q 30/0275 707/731 |
| 2012/0303615 | A1* | 11/2012 | Goswami | G06Q 30/02 707/723 |
| 2013/0024901 | A1* | 1/2013 | Sharif-Ahmadi | H04L 41/12 725/114 |
| 2013/0066885 | A1* | 3/2013 | Komuves | G06Q 10/10 707/748 |
| 2013/0110829 | A1* | 5/2013 | Zhou | G06F 16/951 707/728 |
| 2013/0120666 | A1* | 5/2013 | Sharif-Ahmadi | H04L 41/12 348/734 |
| 2013/0122938 | A1* | 5/2013 | Sharif-Ahmadi | H04L 41/12 455/456.3 |
| 2013/0125014 | A1* | 5/2013 | Sharif-Ahmadi | H04L 41/12 715/748 |
| 2013/0125157 | A1* | 5/2013 | Sharif-Ahmadi | H04L 41/12 725/14 |
| 2013/0125164 | A1* | 5/2013 | Sharif-Ahmadi | H04L 41/12 725/31 |
| 2014/0074811 | A1* | 3/2014 | Wang | G06F 16/951 707/706 |
| 2015/0312305 | A1* | 10/2015 | Totzke | H04L 67/322 709/219 |
| 2016/0063440 | A1* | 3/2016 | Webb | G06Q 10/10 705/7.24 |

OTHER PUBLICATIONS

English abstract of CN101145902 retrieved from Espacenet on Jul. 6, 2016.

* cited by examiner

METHOD OF AND A SYSTEM FOR PROCESSING A SEARCH QUERY

CROSS-REFERENCE

The present application claims priority to Russian Patent Application No. 2014131311, filed Jul. 29, 2014, entitled "METHOD OF AND A SYSTEM FOR WEBSITE RANKING USING AN APPEAL FACTOR" the entirety of which is incorporated herein.

FIELD

The present technology relates to search engines in general and specifically to a method of and a system for ranking search results and generating a search engine result page.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of electronic devices (desktop, laptop, notebook, smartphone, tablets and the like) to have access to any number of web pages and rich content (like images, audio, video, animation, and other multimedia content from such networks).

Generally speaking, a given user can access a resource on the communication network by two principle means. The given user can access a particular resource directly, either by typing an address of the resource (typically an URL or Universal Resource Locator, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource she is interested in.

There are numerous search engines available to the user. Some of them are considered to be general purpose search engines (such as Yandex™, Google™, Yahoo™ and the like). Others are considered to be vertical search engines—i.e. search engines dedicated to a particular topic of search—such as Momondo™ search engine dedicated to searching flights.

Regardless which search engine is used, the search engine is generally configured to receive a search query from a user, to perform a search and to return a ranked search engine results page (SERP) to the user. Factors used within the prior art in the ranking of web pages include relevance to keywords in a search query, how recently the web page has been modified, the number of links from other web pages to the web page in question, the location of the user, among a myriad of others.

SUMMARY

It is an object of the present technology to ameliorate at least some of the inconveniences present in the prior art.

Inventors have developed embodiments of the present technology based on their appreciation of at least one problem associated with the prior art. While the many factors mentioned above may provide a ranked search results list that is highly relevant, timely and trustworthy, a user will likely not use or spend a lot of time on a web page that is not appealing or is unappealing to the user. If a user finds a site offensive, aesthetically displeasing or visually busy for example, the user may not spend enough time on the web page to appreciate the content or other relevant features that would otherwise have satisfied the user's search goals or needs. Thus, inventors have found it advantageous to include the probability that a user finds the web page appealing, in the form of an appeal factor, into the ranking process in order to provide a more useful search results lists to a user submitting a search query. Thus, according to embodiments of the present technology, the search results for inclusion into SERP use several parameters indicative of how close the search results meet the search query (such as relevance of search results, or timeliness, etc), as well as a factor indicative of how likely the given search result will be found to be appealing by the user.

According to a first broad aspect of the present technology, there is provided a method of processing a search query from a user associated with an electronic device and generating a search engine result page (SERP) responsive to the search query, the method executable at a search server coupled to the electronic device via a communication network. The method comprises receiving the search query from the electronic device of the user, performing a search based on the search query and creating a list of search results, ranking the list of search results, the ranking process including accessing a screenshot of at least one web page in the list of search results, determining an appeal factor of the at least one web page based on the screenshot, the appeal factor representing a probability that the web page is appealing to the user, and ranking the at least one web page in the list of search results, the ranking based at least in part on the appeal factor of the at least one web page and generating the SERP responsive to the search query, the SERP including a ranked list of search results.

In some implementations of the method, the appeal factor represents the probability that the web page is visually appealing to the user.

In some implementations of the method, the appeal factor represents the probability that content of the web page is appealing to the user.

In some implementations of the method, the appeal factor is restricted to two values, the two values representing a positive appeal to the user and a negative appeal to the user.

In some implementations of the method, the appeal factor is a numerical value.

In some implementations of the method, the screenshot of the at least one webpage represents the visual appearance of the entirety of the at least one webpage.

In some implementations of the method, the method further includes determining of the appeal factor using a predictor model, the predictor model created using a machine-learning process, the machine-learning process having been trained by executing steps of receiving a dataset of screenshots labeled with corresponding appeal factors and building a predictor model of appeal factor.

In some implementations of the method, the dataset of screenshots labeled with the corresponding appeal factors is created by human testers.

In some implementations of the method, the machine learning process is a Neural Network-based machine-learning algorithm.

In some implementations of the method, the dataset of screenshots labeled with the corresponding appeal factors is created using user browsing history.

In some implementations of the method, the user browsing history includes time data.

According to another broad aspect of the present technology, there is provided a method of processing a search query from a user associated with an electronic device and generating a search engine result page (SERP) responsive to the search query, the method executable at a search server coupled to the electronic device via a communication network. The method comprises receiving the search query from the electronic device of the user, performing the search based on the search query and creating a list of search results, ranking the search results, the ranking process including accessing a first screenshot of a first web page included in the search results, determining a first appeal factor of the first web page based on the first screenshot, the first appeal factor representing a probability that the first web page is appealing to the user, accessing a second screenshot of a second web page included in the search results, determining a second appeal factor of the second web page based on the second screenshot, the second appeal factor representing a probability that the second web page is appealing to the user, and ranking the first web page versus the second web page in the list of search results, the ranking based at least in part on the first appeal factor and the second appeal factor and generating the SERP responsive to the search query, the SERP including a ranked list of search results.

In some implementations of the method, the method further comprises sending the SERP responsive to the search query to the electronic device of the user via the communication network.

According to another broad aspect of the present technology, there is provided a method for calculating a page rank of a web page in a list of web pages, based at least partially on the appeal of the web page. The method comprises accessing a screenshot of the web page, determining an appeal factor for the web page, the appeal factor representing a probability that the web page is appealing to a user based on the screenshot, calculating a ranking score for the web page, the calculation including the appeal factor of the web page.

According to another broad aspect of the present technology, there is provided a server. The server comprises a communication interface for communication with an electronic device via a communication network and a processor operationally connected with the communication interface. The processor is configured to receive the search query from the electronic device of the user, perform the search based on the search query and creating a list of search results, rank the search results, where the processor is further configured to access a screenshot of at least one web page included in the search results, determine an appeal factor of the at least one web page based on the screenshot, the appeal factor representing a probability that the web page is appealing to the user, and rank the at least one web page in the list of search results, the rank based at least in part on the appeal factor of the at least one web page and generate the SERP responsive to the search query, the SERP including a ranked list of search results.

In some implementations of the server, the processor is further configured to send the SERP responsive to the search query to the electronic device.

In some implementations of the server, the screenshot of the at least one webpage represents the visual appearance of the entirety of the at least one webpage.

In some implementations of the server, the appeal factor represents the probability that the web page is visually appealing to the user.

In some implementations of the server, the appeal factor represents the probability that content of the web page is appealing to the user.

In some implementations of the server, the appeal factor is restricted to two values, the two values representing a positive appeal to the user and a negative appeal to the user.

In some implementations of the server, the appeal factor is a numerical value.

In some implementations of the server, the screenshot of the at least one webpage represents the visual appearance of the entirety of the at least one webpage.

In some implementations of the server, the processor is further configured to determine of the appeal factor using a predictor model, the predictor model created using a machine-learning process, the machine-learning process having been trained by executing steps of receiving a dataset of screenshots labeled with corresponding appeal factors and building a predictor model of appeal factor.

In some implementations of the server, the dataset of screenshots labeled with the corresponding appeal factors is created by human testers.

In some implementations of the server, the machine learning process is a Neural Network-based machine-learning algorithm.

In some implementations of the server, the dataset of screenshots labeled with the corresponding appeal factors is created using user browsing history.

In some implementations of the server, the user browsing history includes time data.

In the context of the present specification, unless provided expressly otherwise, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, unless provided expressly otherwise, a "dataset" is any structured collection of data, irrespective of its particular structure, the dataset management software, or the computer hardware on which the data is stored, implemented or otherwise rendered available for use. A dataset may reside on the same hardware as the process that stores or makes use of the information stored in the dataset or it may reside on separate hardware, such as a dedicated server or plurality of servers.

In the context of the present specification, unless provided expressly otherwise, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, unless provided expressly otherwise, the expression "component" is meant to include software (appropriate to a particular hardware context) that is both necessary and sufficient to achieve the specific function(s) being referenced.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be only a description of illustrative examples of the present technology. This description is not intended to define the scope or set forth the bounds of the present technology. In some cases, helpful examples of modifications may be set forth as an aid to understanding the present technology, and not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that particular aspect of the present technology. As a person skilled in the art would understand, this is likely not the case. In addition it is to be understood that the present detailed description provides in certain instances simple implementations of the present technology, and that where such is the case they have been presented in this manner as an aid to understanding. As persons skilled in the art would understand, various implementations of the present technology may be of a greater complexity.

Figure 1:
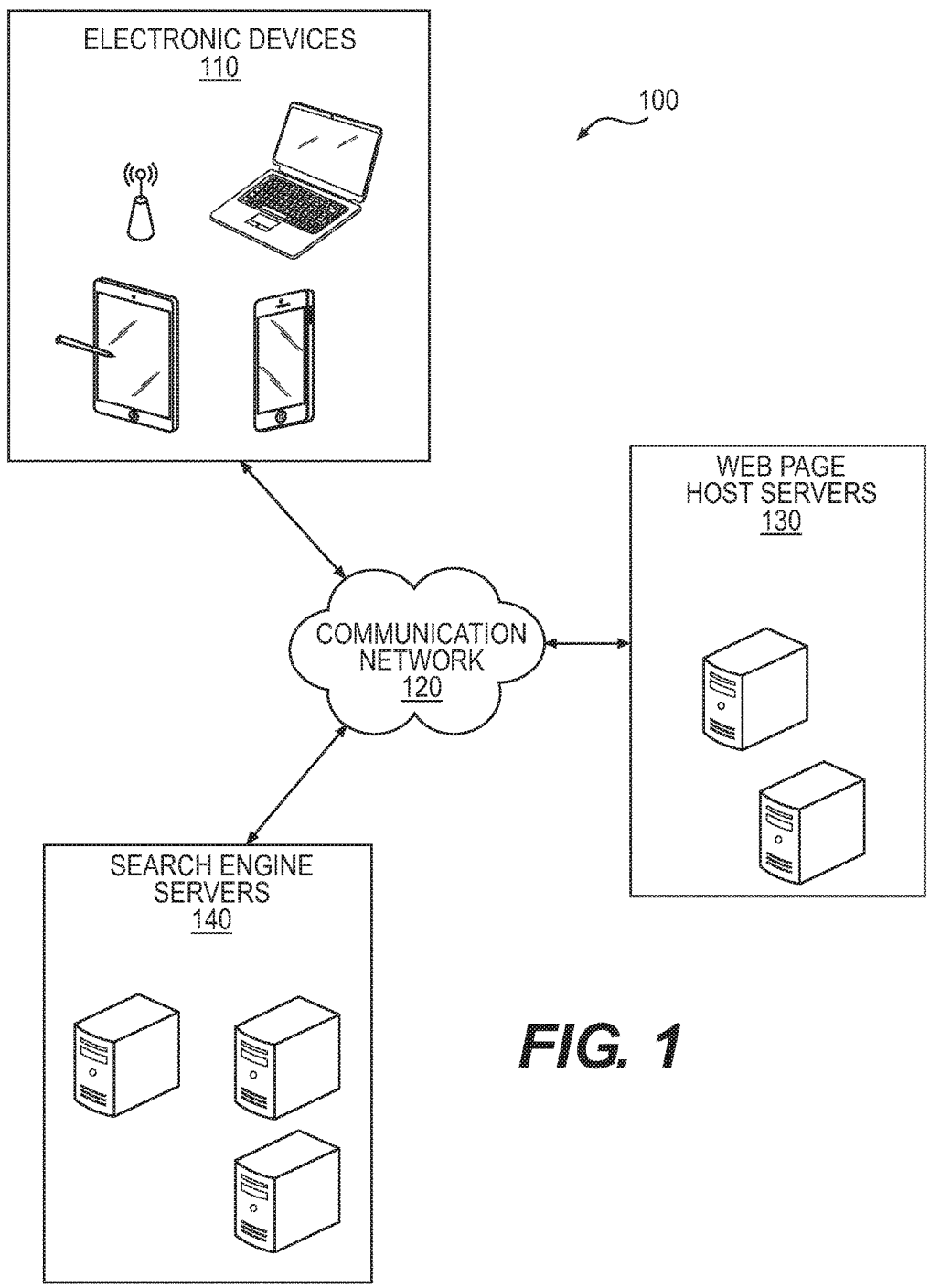
FIG. 1 depicts a system implemented in accordance with non-limiting embodiments of the present technology.

Referring to FIG. 1, a simplified schematic representation of a system 100 is presented. Included in the system 100 are electronic devices 110, the electronic devices 110 including one or more of an electronic device 110, the electronic device 110 being a device utilized by the user of the system 100. The system 100 further includes a communication network 120, which can be implemented as an Internet network.

The system 100 further includes web page host servers 130 and search engine servers 140. For simplicity purposes, and for the sake of the present description, the system 100 is depicted with only three categories of node, namely electronic devices 110, web page host servers 130 and search engine servers 140 connecting through a communication network 120. However, those skilled in the art will recognize that the system 100 could include many more categories of node, and in each category of node, multiple types of equipment could be used. Each category of node may communicate with the other categories of node, in accordance with established protocols and standards. Additionally, the number of each node may be different in different implementations, where a user may use one or more electronic devices 110 to access the communication network 120 in order to access a single or multiple web page host servers 130 or a single or multiple search engine servers 140.

Various types of electronic devices 110 may be used in the context of the present technology. For example, the electronic device 110 may be a smart phone, a tablet, a laptop, a computer, a television, a game console, or any other type of electronic device which is adapted for, and capable of, accessing the communication network 120. The electronic device 110 may access the communication network 120 directly, or through an extranet server, a Wi-Fi access point, an Internet service provide, a cellular service provider, etc.

To conduct an Internet search, a user of the electronic device 110 opens a web browser application, and may select a search engine application. In some implementations, the search engine functionality is configured to automatically provide access to a specific search engine application, while in other implementations, a list of search engine applications, or a random search engine application is provided. The user of the electronic device 110 then enters one or more keywords corresponding to the information desired to be searched. The keywords may further be grouped or separated by Boolean expressions recognized by the search engine application. The keyword(s) and the Boolean expressions, if used, form a search query sent by the electronic device 110 to the search engine server 140 by way of the communication network 120. The search engine server 120 may include one or multiple servers receiving search queries, conducting searches, and providing search engine results pages in parallel or in sub-groups for multiple electronic devices.

It should be expressly understood that implementations for the electronic device 110, the communication network 120, the web page host servers 130 and the search engine servers 140 are provided for illustration purposes only. As such, those skilled in the art will easily appreciate other specific implementation details for the electronic device 110, the communication network 120, the web page host servers 130 and the search engine servers 140. As such, examples provided herein above are by no means meant to limit the scope of the present technology.

Figure 2:
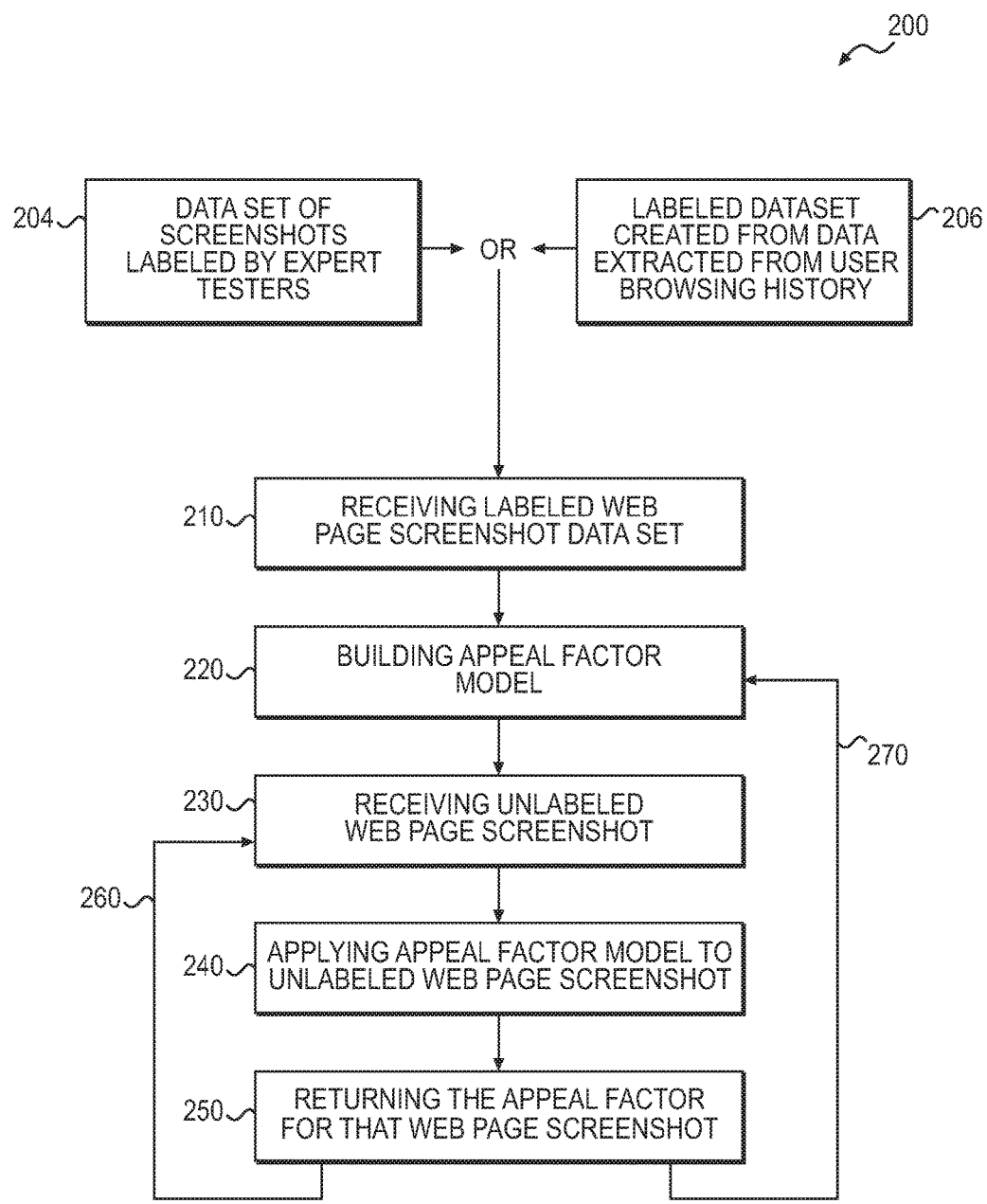
FIG. 2 is a flow diagram of a method for determining an appeal factor of a web page, the method being executable within the system of FIG. 1 and being implemented in accordance with non-limiting embodiments of the present technology.

Referring to FIG. 2, a flow diagram for a non-limiting embodiment of the present method 200 for determining the appeal factor for a web page screenshot is presented. This method 200 could be performed by the processor of the search engine server 140 receiving the search query from the electronic device. The method 200 could also be performed by a separate server having a processor configured to perform the method 200.

The method 200 for determining the appeal factor for a web page screenshot begins by receiving a dataset of training data. This dataset of training data can include a dataset labeled by expert human testers 204 or a labeled dataset created from data extracted from user browsing history 206.

For datasets of screenshots and their corresponding appeal factors for creating an appeal factor predictor model based on labeling by expert testers, human users inspect web page screenshots individually and apply an appeal factor score to each. The appeal factor scoring could be based on, but is not limited to, the expert testers' overall reaction to the web page, the visual appeal of the web page, the content of the web page or any number of web page characteristics.

For datasets of screenshots and their corresponding appeal factors created using user browsing histories, screenshots of web pages are paired with data extracted from the history of user's actions in regard to those sites. This history can be collected over by collecting information representative of user interactions with the various web pages. This user browsing history can be stored in a log at search engine server 140. User browsing history could include, but is not limited to, users' actions after clicking to the web page. For example, if users click through the web page to connected web pages, the page may be more appealing than if the users had clicked back to the SERP to find another web page for the same search.

In some non-limiting embodiments, the user browsing history could include time data. Time data could include, but is not limited to, the time spent on a web page by users before clicking away to another site or back to the SERP. For example, very short times spent on a web page before clicking back to the SERP could indicate a web page that is less appealing or unappealing to users. Extended time spent on a web page by users could likewise indicate that the site is more appealing to users. This collection and extraction of data can be performed by search engine server 140 before implementation of method 200. In other words, before implementing the steps of the method 200, the search engine server 140 can monitor user interactions with various web pages and, based on the analysis of the user interactions, set up datasets of screenshots and their corresponding appeal factors derived from user interactions.

Upon receiving either one of these types of training datasets 210, the method 200 proceeds in building an appeal factor model 220 using a machine learning process. In a machine learning process, which can be interpreted as a supervised learning process, a learning algorithm takes training examples, in this case the dataset of labeled web page screenshots received at step 210. The algorithm then searches for a functional relationship between the training example inputs and training example outputs. By receiving a dataset 210 of training examples, the learning algorithm builds a model of the functional relationship which, once completed, can be applied to a new input for which an output is not known. In the case of the present technology, once an appeal factor predictor model is built through a machine learning process, the appeal factor model can be applied to a new web page screenshot to find its predicted appeal factor representing the probability that a user finds a web page appealing. For the present technology, the training example inputs are the web page screenshots and the training example outputs are the corresponding appeal factor scores, determined as described above.

In some embodiments of the present technology, the machine learning process used to build the appeal factor model is a Neural Networks type machine learning process. A Neural Networks type machine learning process is a type of computational model in which a series of artificial neurons (computational nodes) are connected together to perform computational tasks. The network connections of the nodes are inspired by the brain and nervous system structure of biological creatures. The types of tasks capable of being performed by a Neural Networks type process include machine learning as well as pattern recognition.

In some embodiments, the predictor model could learn to apply a bimodal appeal factor, such as a "good" and "bad" label, to web page screenshots, implying that they are either appealing or unappealing to the user, respectively. Other bimodal appeal factors that the model could apply include, but are not limited to, "appealing" and "non-appealing" or "high" and "low". The bimodal label could also be a numerical bimodal label such as 1 and 0, representing appealing and unappealing web page screenshots respectively. Naturally, the bimodal appeal factor can be implemented in any other suitable way.

In some embodiments, the model could learn to apply a numerical value to the screenshot, for example giving screenshots that the model determines will be appealing to the user a high numerical value and a low numerical value to screenshots determined to be unappealing. Some non-limiting examples of the numerical value of appeal factor that the model could apply include the ranges of 1 to 5, 1 to 20, or 1 to 100, among many other possibilities. Naturally, the numerical value of appeal factor can be implemented in any other suitable way.

What has been described above is the so-called provisioning stage of building the model. We now turn our attention to the in-use stage, where the mode, is applied to unlabeled web page screenshots.

The method 200 having finished building an appeal factor model at step 220, the method 200 continues by receiving an unlabeled web page screenshot 230. The method 200 then proceeds by applying the appeal factor predictor model to this unlabeled web page screenshot of unknown appeal to determine an appeal factor in step 240. The functional model built by the machine learning process described above takes the web page screenshot with unknown appeal factor, applies the appeal factor model and creates an output appeal factor model for the new web page that represents the probability that a user finds this new web page appealing. Upon applying the appeal factor model to the unlabeled screenshot 240, the method 200 includes returning the appeal factor for that unlabeled web page screenshot in step 250. The appeal factor returned in step 250 can be used in a ranking method. It could also be passed to another processor and/or server to be used in a ranking method.

The steps 210 through 250 of method 200 may be performed sequentially in one session, as described above. The steps 210 through 250 may also be split into different phases. For example, the method 200 may perform the receiving of labeled web page screenshot dataset 210 and the building of an appeal factor model 220 at a first instance in time. The appeal factor model may then be stored, for example by the search engine server 140, until the method 200 continues with steps 230 through 250 of receiving an unlabeled web page screenshot 230 through returning the appeal factor for that web page screenshot 250 in a second phase of method 200, the receiving being done at a second instance in time.

In some embodiments of the present technology, the method 200 loops back 260 from step 250 to step 230, where the method 200 receives a (now different) unlabeled web page screenshot.

Similarly, method 200 may include a feedback loop 270 where the step 220 of building the appeal factor model is repeated, based at least in part on the results of step 250 of the method 200 of returning the appeal factor for the previous web page screenshot. In this way the appeal factor model the method 200 is building in step 220 can be revised iteratively. More specifically, in some embodiments of the present technology, the results of the appeal factor model ranking unlabelled screenshot can be reviewed and feedback can be provided back into the appeal factor model as the feedback loop 270.

Figure 3:
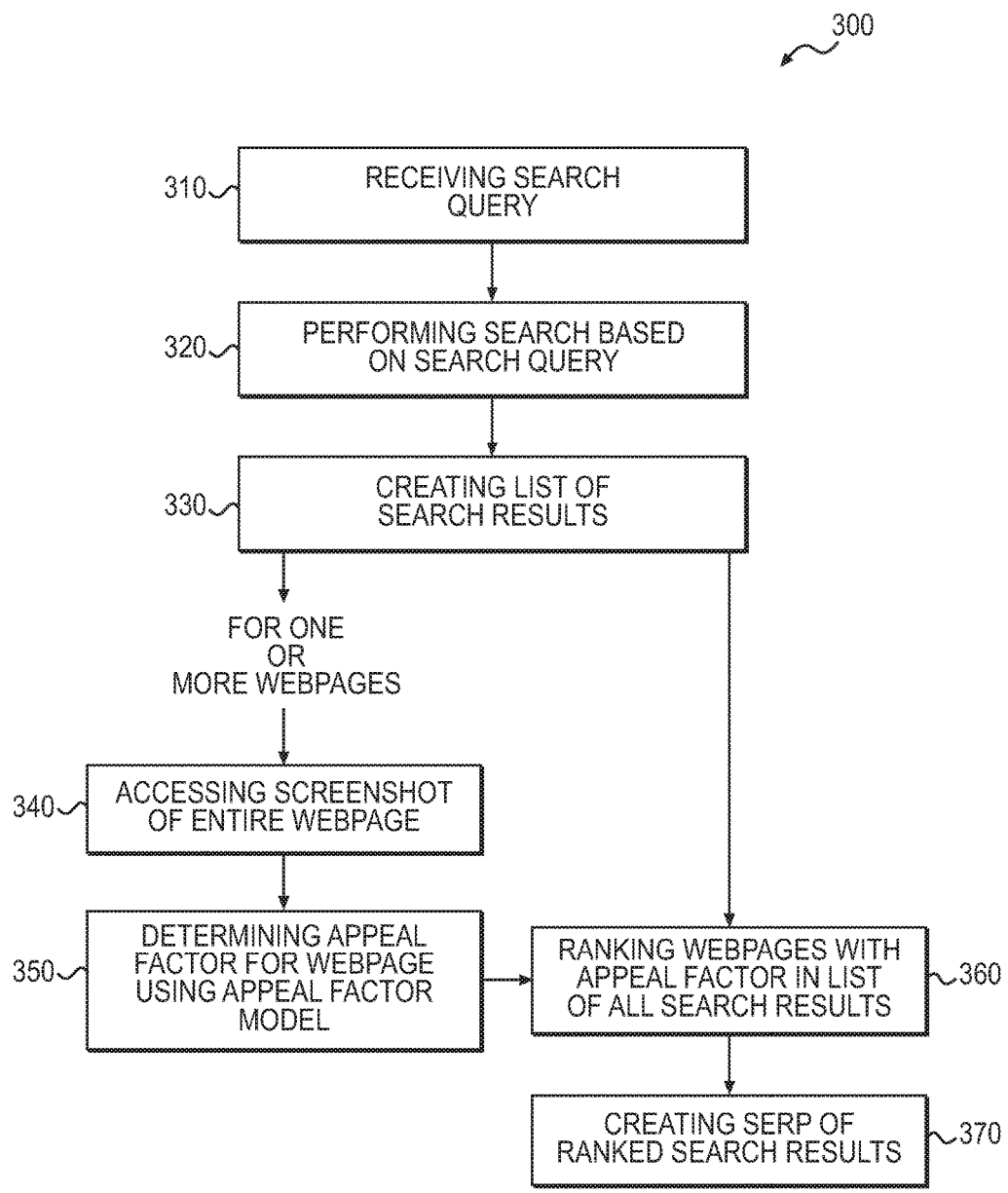
FIG. 3 is a flow diagram of a method for creating a search engine results page, the method being executable within the system of FIG. 1 and being implemented in accordance with non-limiting embodiments of the present technology.

FIG. 3 is a flow diagram of a method 300 for creating a search engine results page of ranked search results 370. The method 300 is executable within the system of FIG. 1 and is implemented in accordance with non-limiting embodiments of the present technology.

The method 300 begins by receiving a search query 310 as entered by a user on an electronic device 110 and sent through the communication network 120 to a search engine server 140. Upon receipt of the search query 310, the method 300 continues at step 320 by performing a search based on the search query.

From the search based on the search query, the method 300 proceeds by creating a list of search results in step 330. The list of search results may include one or more web pages. In the present method, one or more of the web pages in the list of search results are further examined to determine a corresponding appeal factor to be taken into account in the eventual search result ranking and creation of a SERP.

For one or more web pages in the list of search results, step 340 of method 300 continues by accessing a screenshot of the entire web page for the one or more webpages. If a screenshot of the one or more webpages is not readily available, one may be created at this step. If there is an already existing screenshot of the one or more webpages, the screenshot or screenshots may be accessed from the web page host server 130.

The screenshot or screenshots may also be accessed from a search engine index, where it may have already been saved by a search engine crawler. A search engine crawler may be used to visit websites and then index each to a search engine index, including prior to any search or method 200 or method 300 taking place. Before a search is undertaken by the search engine server 140, the crawler may take a snapshot (electronic copy) of the webpages and index the webpages visited, snapshots being processed by the search engine index. The crawler(s) can also be used for creating screenshots, validating URL addresses, metadata and HTML tags of visited webpages.

The method 300 continues by determining an appeal factor 350 using the appeal factor predictor model for the one or more web pages as described above and as constructed in method 200. The process of accessing the screenshot and utilizing the appeal factor model to determine the appeal factor may be performed for only one web page, or may be repeated for multiple entries in the list of search results.

Having determined the appeal factor for one or more web pages at step 350, the method continues by ranking the web pages having an appeal factor in the list of all search results at step 360. The ranking of the web pages 360 is based at least in part on the appeal factor. There are many factors that may be taken into account in the ranking process, as described above, and in this method the determined appeal factor is included among the others for the one or more web pages for which the appeal factors were found.

Creating a search engine result page (SERP) of the ranked results 370 finishes method 300. The ranked list of search results based at least in part on the appeal factor of one or more web pages. In some embodiments, the SERP is subsequently sent to the electronic device via the communication network by the search engine or other server.

Figure 4:
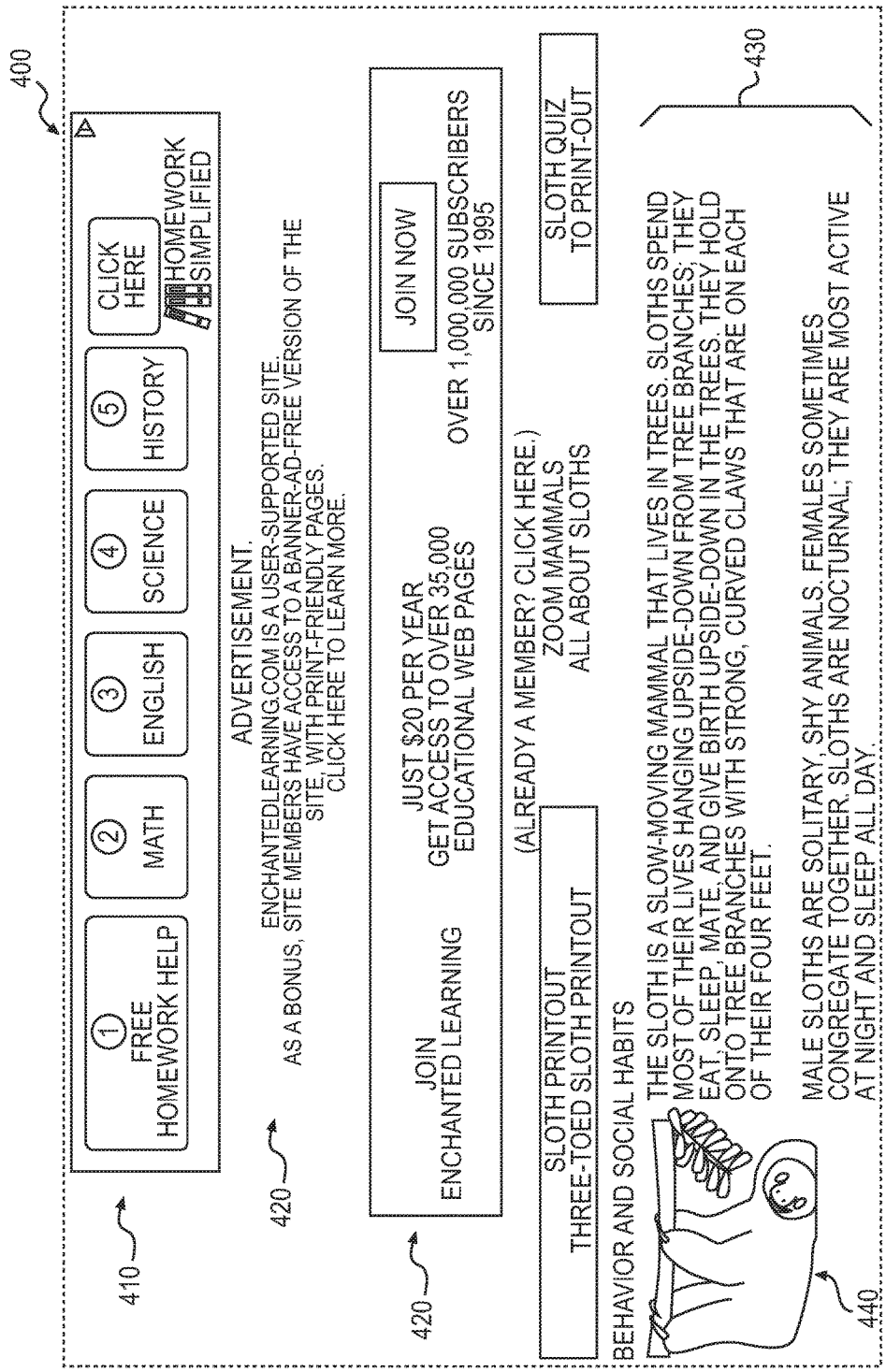
FIG. 4 is a screenshot of an example of a web page that may be less appealing to a user.
Figure 5:
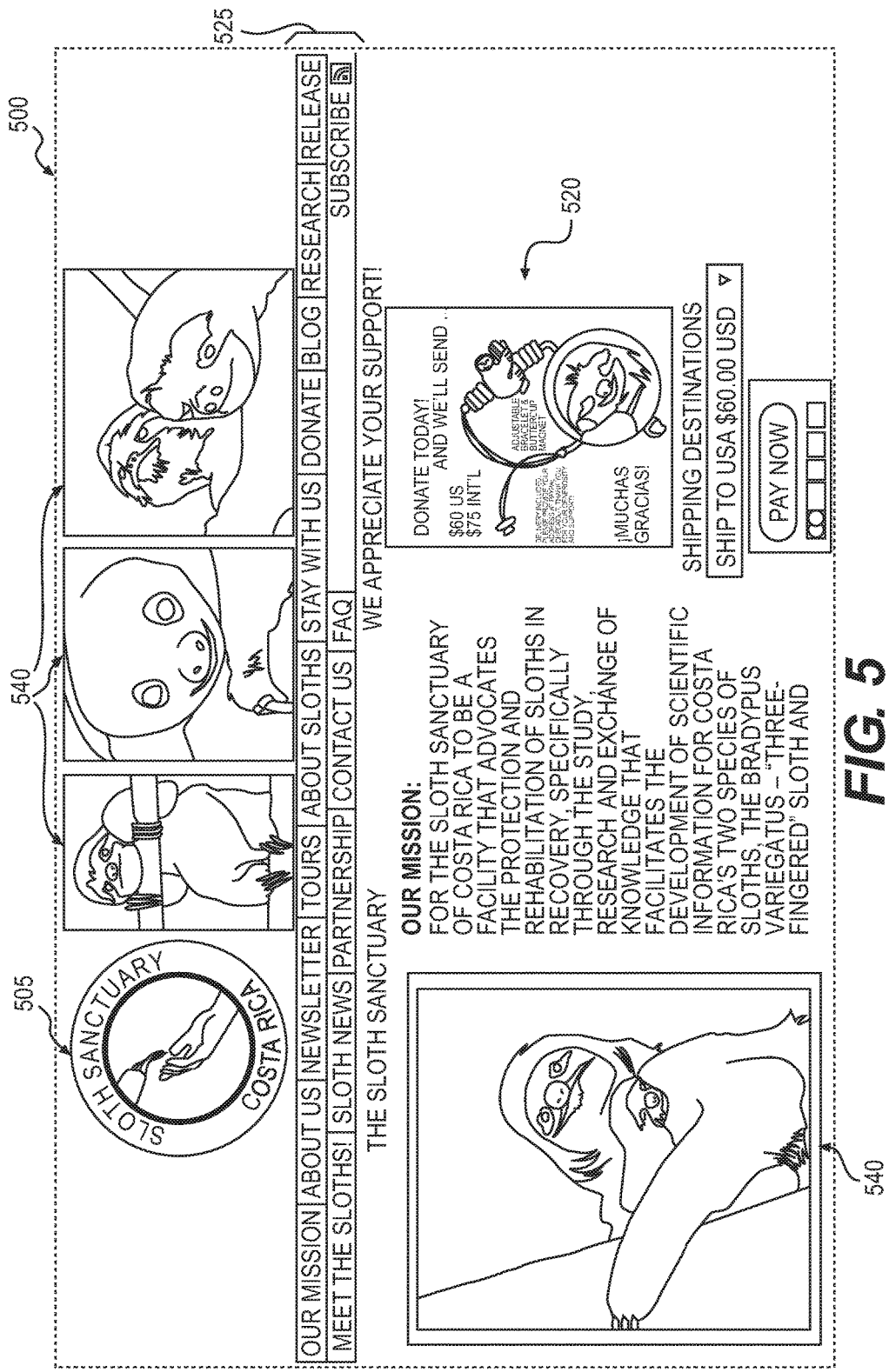
FIG. 5 is a screenshot of an example of a web page that may be more appealing to a user.

Referring concurrently to FIGS. 4 and 5, two screenshots of web pages are presented as examples of two web pages found on a single SERP responsive to the search query "sloths". These two pages are examples of the case where a user might find one web page less appealing and one more appealing, both web pages nominally satisfying the user's needs in the same search query. Using the present technology, the appeal factor based ranking would then rank these pages accordingly.

In FIG. 4, a screenshot 400 of a web page is displayed. This screenshot is presented as an example of a web page that a user may find less appealing. Some aspects that may lead to an appeal factor indicating "less appealing" include, but are not limited to, the number and size of advertisements 410, the number and size of membership advertisements 420, content of the page 430 and the number and size of images 440. For example, a user may find the large banner advertisement 410 or the multiple large calls for membership 420 that take up a large portion of the web page an unappealing characteristic. Similarly, a small portion of the web page is taken up by actual content 430 and that may be less appealing to a user as well.

In addition to the less appealing features on the web page, there are also features that do not appear on the screenshot 400 of the web page that may render it less appealing. For example, there is no clear indication of the website owner, nor is there much clear navigational information. The lack of this information on the web page may render the web page less appealing, negatively affecting the appeal factor score. In addition, there is only one image 440 on the web page. It may be that a user searching "sloths" would find it appealing to see images of sloths, and the lack of images could also negatively affect the appeal factor score.

In FIG. 5, a screenshot 500 of a web page is displayed. The web page was also found through a search engine with a search query of "sloths". This screenshot is presented as an example of a web page that a user may find more appealing. Examples of features that may render this web page more appealing to a user could include, but are not limited to, the clear indication of website ownership 505, the variety of navigational links 525 to navigate through the website, the size and number of membership advertisements 520 and the size and number of images 540. For example, there is a large, clear logo 505 indicating that the website is owned by the Sloth Sanctuary of Costa Rica. It may be appealing to a user searching for "sloths" to know who owns the website in order to have an idea of the trustworthiness of the site. The web page also contains 4 different large images of sloths 540. It may be that a user searching "sloths" would find it appealing to see images of sloths, and the images of this web page could positively affect the appeal factor score. Additionally, there is a series of navigational links 525 for the website, which may be appealing to a user. In contrast to the web page of FIG. 4, on this web page there is only one advertisement 520 for becoming a member to the website's organization and there are no banner ads. This could positively affect the appeal factor score as well.

With the screenshots of web pages of FIGS. 4 and 5 in mind, it is pertinent to mention that the ultimate goal of a ranked SERP is not only to find the most relevant or timely web page corresponding to a search query, but also to provide a SERP that serves the needs of the user. While many factors are involved in any given ranking process, the relevance or timeliness for example of a web page for a particular search query may be less important if a web page chosen by the user is so unappealing that the user immediately clicks away. The web page of FIG. 4 may generally rank higher than the web page of FIG. 5, but a user may not appreciate the reasons for which it is ranked higher in the time that the user has decided that it is unappealing for some of the possible reasons described above, and clicked back to the SERP to find a more appealing web page. Thus in this way, including a factor based on the probability that a user finds a web page appealing could improve a SERP by better meeting the needs of the user.

The non-limiting example presented herein of two web pages found for the search query "sloths" is just one type of web page that could be ranked in a SERP in part with regard to their probability of being found appealing by the user. It should be noted that the present method and system are not limited to web pages of this or similar subject matter. The present technology is applicable to any type of web page that may be found through a search engine responsive to a search query submitted by a user on an electronic device via a communication network.

Even though the forgoing description has been presented using the size and number of advertisements, the size and number of images, the availability of navigational links and others as factors rendering a web page appealing or unappealing to a user, embodiments of the present technology are not so-limited. As such, within alternative embodiments of the present technology, the properties of screenshots of web pages can be any type of object or characteristic ascertainable from a web page screenshot capable of influencing the opinion of a user as to the appeal of the web page. Non-limiting and non-exhaustive examples of objects and characteristics ascertainable from a screenshot of a web page include: amount of subject matter content, visual contrast of page, aesthetic style of the page, colors of the web page, font style, font color and size, size and number of images, content of images, sexual images or content, violent images or content, religious images or content, size and number of advertisements, or availability and layout of navigational links.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of processing a search query from a user associated with an electronic device and generating a search engine result page (SERP) responsive to the search query, the method executable at a search server coupled to the electronic device via a communication network, the method comprising:
   receiving the search query from the electronic device of the user;
   performing the search based on the search query and creating a list of search results;
   ranking the search results, the ranking process including:
      accessing a first screenshot of a first web page included in the search results, where the first screenshot:
         has been previously created, the accessing the first screenshot including accessing the first screenshot from a web page server, and
         has not been previously created, the accessing the first screenshot including creating the first screenshot,
      determining a first appeal factor of the first web page as a function of the first screenshot, the first appeal factor representing a probability that the first web page is appealing to the user,
      accessing a second screenshot of a second web page included in the search results, where the second screenshot:
         has been previously created, the accessing the second screenshot including accessing the second screenshot from a web page server, and
         has not been previously created, the accessing the second screenshot including creating the second screenshot,
      determining a second appeal factor of the second web page as a function of the second screenshot, the second appeal factor representing a probability that the second web page is appealing to the user, and
      ranking the first web page versus the second web page in the list of search results, the ranking based at least in part on the first appeal factor and the second appeal factor; and
   generating the SERP responsive to the search query, the SERP including a ranked list of search results.

2. The method of claim 1, further comprising:
sending the SERP responsive to the search query to the electronic device of the user via the communication network.

3. A server comprising: a communication interface for communication with an electronic device via a communication network and a processor operationally connected with the communication interface, the processor configured to:
receive the search query from the electronic device of the user;
perform the search based on the search query and creating a list of search results;
rank the search results, where the processor is further configured to:
access a first screenshot of a first web page included in the search results, where the first screenshot:
has been previously created, the accessing the first screenshot including accessing the first screenshot from a web page server, and
has not been previously created, the accessing the first screenshot including creating the first screenshot,
determine a first appeal factor of the first web page as a function of the first screenshot, the first appeal factor representing a probability that the first web page is appealing to the user,
access a second screenshot of a second web page included in the search results, where the second screenshot:
has been previously created, the accessing the second screenshot including accessing the second screenshot from a web page server, and
has not been previously created, the accessing the second screenshot including creating the second screenshot,
determine a second appeal factor of the second web page as a function of the second screenshot, the second appeal factor representing a probability that the second web page is appealing to the user, and
generate the SERP responsive to the search query, the SERP including a ranked list of search results.

4. The server of claim 3, the processor further configured to send the SERP responsive to the search query to the electronic device of the user via the communication network.

\* \* \* \* \*